United States Patent [19]

Bidner et al.

[11] Patent Number: 5,714,673
[45] Date of Patent: Feb. 3, 1998

[54] METHOD AND APPARATUS FOR MONITORING ENGINE CONTROL SENSORS

[75] Inventors: David Karl Bidner, Livonia; Jerry Dean Robichaux, Lincoln Park, both of Mich.

[73] Assignee: Ford Global Technologies, Inc., Dearborn, Mich.

[21] Appl. No.: 748,038

[22] Filed: Nov. 13, 1996

[51] Int. Cl.⁶ .................................................. G01M 15/00
[52] U.S. Cl. .................................................. 73/1.57
[58] Field of Search ..................... 73/4 R, 118.1, 73/1.57; 340/438, 451; 364/424.039, 424.036

[56] References Cited

U.S. PATENT DOCUMENTS

| | | | |
|---|---|---|---|
| 4,567,756 | 2/1986 | Colborn | 73/118.1 |
| 5,029,570 | 7/1991 | Stolman et al. | |
| 5,331,936 | 7/1994 | Messih et al. | 123/480 |
| 5,526,266 | 6/1996 | Rutan et al. | |
| 5,554,801 | 9/1996 | Watanabe | 73/4 R |

*Primary Examiner*—Robert Raevis
*Attorney, Agent, or Firm*—Jerome R. Drouillard; Roger L. May

[57] ABSTRACT

An inferred manifold absolute pressure based in part on measured manifold mass air flow is compared with a measured manifold absolute pressure from a MAP sensor and if the rolling average of the difference between the two exceeds either a rich or lean limit, an indicator is energized and a code is stored to identify possible MAP sensor deterioration.

15 Claims, 2 Drawing Sheets

METHOD AND APPARATUS FOR MONITORING ENGINE CONTROL SENSORS

TECHNICAL FIELD

This invention relates to a method and apparatus for monitoring the condition of sensors that provide data to a controller of an internal combustion engine.

BACKGROUND ART

In order to reduce motor vehicle emissions, a computer with sophisticated software is employed to precisely control engine operating conditions. The computer is programmed to control such emission sensitive functions as spark timing, fuel, exhaust gas recirculation, secondary air injection, and idle speed. Usually the computer is programmed to also perform diagnostic routines to verify proper actuator and sensor operation, perform system checks, and control an indicator light to inform the driver of any problem. Also, codes may be stored for later use by service personnel.

Engine fuel control systems usually calculate the desired fuel to be delivered to the cylinder based an estimated cylinder air charge that is, in part, based on the measured mass air flow to the engine cylinder. There are several approaches used in engine fuel control system for estimating cylinder air charge. One approach uses a MAP sensor with a speed density model, another uses a MAF sensor with a manifold filling model.

Increased fuel efficiency may be obtained by operating an engine on less than its full complement of cylinders during certain running conditions. For example, at low-speed, low-load operation, it is possible to save fuel by operating the engine on four cylinders instead of eight cylinders, or three cylinders instead of six cylinders. In a variable displacement engine (VDE), most accurate results are obtained by using the speed density strategy during transitions and the manifold filling strategy during steady-state conditions.

Speed density strategies use measurements of air charge temperature, engine speed, barometric pressure, EGR flow and manifold absolute pressure (MAP). There are about 80 transitions during a Federal Test Procedure emissions cycle and the cumulative effects on emissions of a deterioration of the MAP sensor can be substantial. It is desirable therefore, that a functionality and rationality test be performed to determine if the MAP sensor data should be used for controlling fuel delivery.

SUMMARY OF THE INVENTION

During steady-state VDE operation or during operation on conventional fixed displacement engine, air charge estimates are based in part on the measured manifold mass air flow, using a manifold filling model such as disclosed in commonly assigned to Messih et al U.S. Pat. No. 5,331,936 the disclosure of which is incorporated herein by reference. Messih et al also discloses a method of inferring manifold absolute pressure based in part on measured mass air flow.

In accordance with the present invention the difference between the aforementioned inferred MAP value and the measure value from a MAP sensor is used to indicate potential deterioration in the MAP sensor. If a rolling average of the difference exceeds either a rich or lean limit, an indicator is energized and a code is stored so that the MAP sensor can be examined and replaced if necessary during service.

BRIEF DESCRIPTION OF THE DRAWINGS

A more complete understanding of the present invention may be had from the following detailed description which should be read in conjunction with the drawings in which.

DETAILED DESCRIPTION OF PREFERRED EMBODIMENT

Figure 1:
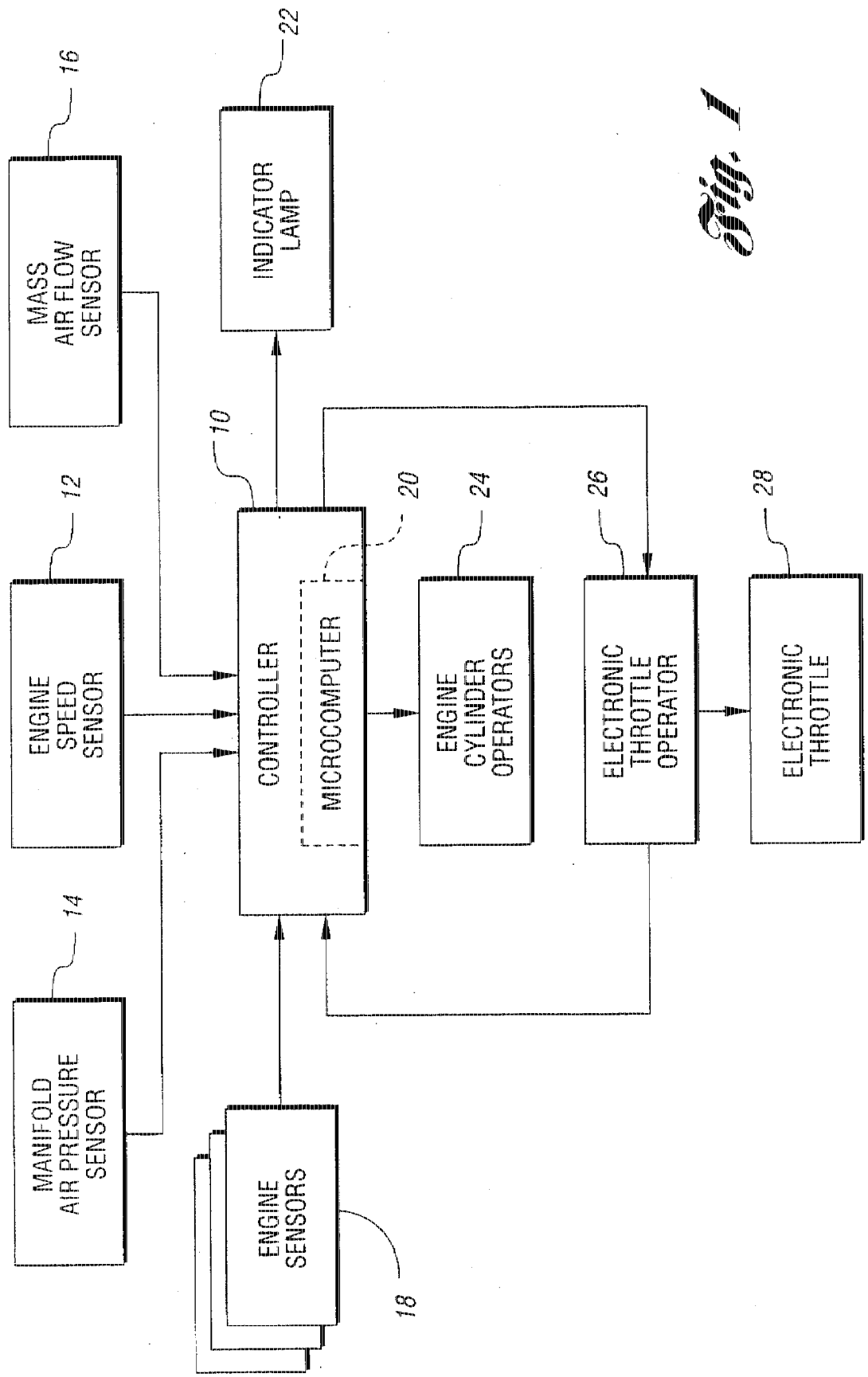
FIG. 1 is a block diagram of a MAP sensor monitoring system for a variable displacement engine.

Referring now to the drawings and initially to FIG. 1, a control system for an internal combustion engine includes a controller 10 that receives inputs from a sensor 12 that senses engine speed, a sensor 14 that senses the engine manifold absolute pressure, a sensor 16 that senses mass air flow to the engine, and various sensors 18 for measuring other engine characteristics such as throttle position, air charge temperature and other characteristic known to those skilled in the art and suggested by this disclosure.

Controller 10 includes a microcomputer 20 that utilizes the inputs from the various sensors and its own stored program and data, which may include limit values for various engine parameters or time-oriented data. Though not shown, it will be understood that microcomputer 20 includes an arithmetic logic unit (ALU), read only memory (ROM) for storing control programs and calibration data, random access memory (RAM) for temporary data storage, that may also be used for counters or timers, and keep-alive memory (KAM) for storing learned values. The ROM, RAM and KAM communicate with the ALU over an internal data bus as is well known. The controller 10 outputs a fuel injector signal to engine fuel injectors, that is varied over time to maintain a desired air/fuel ratio.

Controller 10 may also operate spark timing/control, exhaust gas recirculation (EGR), intake air flow, and other engine and power transmission functions. The controller 10 controls the illumination of an indicator lamp 22 in accordance with the flow chart shown in FIG. 2.

While the invention is not limited to a VDE, in the example shown the controller 10 has the capability of disabling selected cylinders in the engine, causing the engine to have a decreased effective displacement, through control of a plurality of engine cylinder operators 24. An engine operating with less than its full complement of cylinders is said to be in fractional mode, as opposed to maximum mode which utilizes all engine cylinders to provide maximum effective displacement. For example, with an eight-cylinder engine, controller 10 may operate the engine on three, four, five, six, seven, or eight cylinders, as warranted by the driver's demanded torque, a specific emissions calibration, and environmental conditions.

Those skilled in the art will appreciate that a number of different disabling devices are available for selectively rendering inoperative one or more engine cylinders. Such devices include mechanisms for preventing any of the cylinder valves in a disabled cylinder from opening, such that gas remains trapped within the cylinder.

Controller 10 operates electronic throttle operator 26, which may comprise a torque motor, stepper motor, or other type of device which positions an electronic throttle 28 that provides feedback to controller 10 regarding throttle position.

The mass air flow signal from sensor 16, and other data such as the number of cylinders, engine speed, and barometric pressure, is use by the microcomputer 20 to calculate a cylinder air charge value using a manifold filling model during steady-state conditions. The cylinder air charge value is used in calculating the fuel to be supplied to the engine cylinder.

The cylinder air charge value is also used to infer the manifold absolute pressure (MAP) in accordance with the following equation developed in the aforementioned Messih et al patent.

$$MAP=[(B0+B1*N+B2*N^2)(BP/29.92)]+B3*Mc$$

where:

MAP is the inferred manifold air pressure at a given barometric pressure (BP);

BP is barometric pressure (in.Hg.);

29.92 is the standard barometric pressure (in.Hg.);

N is the engine speed in RPM;

B0, B1, B2, B3 are engine design specific regression coefficients; and

Mc is the cylinder air charge; and is inferred by the controller 10 in accordance with the flow chart shown in FIG. 4 of the Messih et al patent, based in part on mass air flow measured by sensor 16.

The manifold absolute pressure from sensor 14 is utilized by the microcomputer 20 to calculate a cylinder air charge value using a conventional speed density model during transition between fractional and maximum modes.

Figure 2:
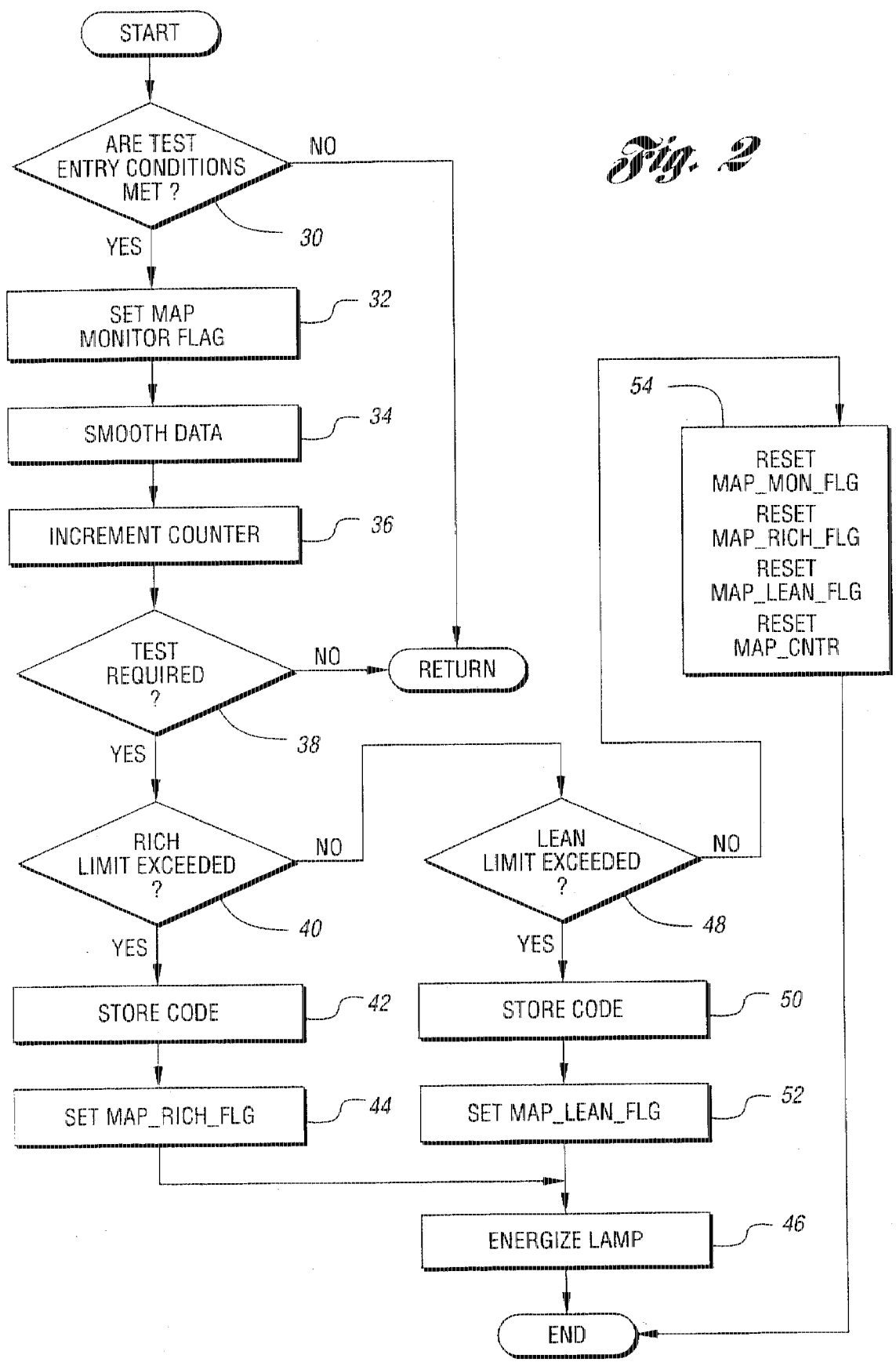
FIG. 2 is a flowchart illustrating the operation of the system generally depicted in FIG. 1.

Referring now to FIG. 2, a flowchart depicting the operation of the sensor monitoring system is shown. At block 30, a check is made to determine whether all entry condition for running the emission test have been met. These may include whether engine coolant temperature is greater than a calibratable minimum, engine speed is between upper and lower calibratable limits and engine load is less than a maximum calibratable limit. If the condition are not met the subroutine returns to the main program. Otherwise, a MAP monitor flag MAP_MON_FLG is reset at block 32. At block 34, a rolling average of the difference between the inferred MAP and measured MAP is determined to obtain an smoothed average of the difference or DELTA_MAP_AVE. This may be expressed as:

$$DELTA\_MAP\_AVE=ROLAVE(DELTA\_MAP)$$

where $$DELTA\_MAP=INFERRED\ MAP—SENSED\ MAP.$$

Assuming the mass air flow sensor 16 is providing valid data a negative difference results in a rich fuel mixture while a positive difference results in a lean fuel mixture. Assuming the MAP sensor is providing valid data a negative difference results in a lean fuel mixture while a positive difference results in a rich fuel mixture. A MAP test counter $MAP_{13}$ CNTR is incremented at block 36. At block 38 a decision is made whether a test is required based on whether the MAPCNTR exceeds a predetermined maximum count. If the count is not exceeded the subroutine return to the main program.

If a test is required, as determined at block 38, $DELTA_{13}$ MAP_AVE is compared with a negative limit at block 40 and if the limit is exceeded, a code is stored at block 42, a $MAP_{13}$ $RICH_{13}$ FLG is set at block 44, and the lamp 22 is energized at block 46. If the negative limit is not exceeded the DELTAMAPAVE is compared with a positive limit at block 48 and if the positive limit is exceeded, a code is stored at block 50, a MAPLEANFLG is set at block 52, and the lamp 22 is energized at block 46. If neither limit is exceeded the various flags and the counter are reset at block 54.

It will be apparent that the detection of MAP sensor deterioration relies on the expected high quality of data obtained from the MAF sensor. The invention can also be practiced by relying on the data from the MAP sensor as a criteria for determining deterioration of the MAF sensor. In either case, the out of limit $DELTA_{13}$ MAPAVE value would dictate a code storage and lamp illumination. The code stored would depend on which sensor data was considered more reliable. Also, the MAP sensor is considerably less costly than the MAF sensor and may be added merely for the purpose of checking the validity of data from the MAF sensor in a non-VDE application.

While the best mode for carrying out the present invention has been described in detail, those familiar with the art to which this invention relates will recognize various alternative designs and embodiments for practicing the invention as defined by the following claims.

What is claimed is:

1. A method of monitoring the condition of at least one of a plurality of sensors supplying data to an internal combustion engine, comprising a sequence of the steps of:

comparing an inferred manifold absolute pressure value based at least in part from data obtained from a mass air flow sensor with a measured manifold absolute pressure value to obtain difference value;

comparing said difference value with a predetermined limit; and storing a code identifying potential sensor deterioration if said limit is exceeded.

2. A method according to claim 1, further comprising the step of operating an indicator if said limit is exceeded.

3. A method according to claim 2, wherein said limit includes both a positive and a negative limit value.

4. A method according to claim 3, wherein said difference value is a rolling average of the difference between said inferred and measured manifold absolute values over a time interval.

5. A method according to claim 4, wherein the code stored identifies potential manifold absolute pressure sensor deterioration.

6. A method according to claim 5, wherein said engine is a variable displacement engine.

7. A method according to claim 6, wherein said sensor is a manifold absolute pressure sensor supplying data used to calculate cylinder air charge during transitions between fractional and maximum modes of operation.

8. A method according to claim 4, wherein the code stored identifies potential mass air flow sensor deterioration.

9. Apparatus for monitoring the condition of at least one of a plurality of sensors supplying data to an internal combustion engine, comprising:

a mass air flow sensor;

an manifold absolute pressure sensor;

an engine controller for calculating an inferred manifold absolute pressure calculated value based on data provided by said mass air flow sensor;

said controller comparing said calculated value with data provided by said manifold absolute pressure sensor to obtain a difference value;

said controller comparing said difference value with a predetermined limit and storing a code identifying potential sensor deterioration if said limit is exceeded.

10. Apparatus according to claim 9, further comprising:

an indicator operated by said controller if said limit is exceeded.

11. Apparatus according to claim 10, wherein said limit includes both a positive and a negative limit value.

12. Apparatus according to claim 11, wherein the code stored identifies potential manifold absolute pressure sensor deterioration.

13. Apparatus according to claim 12, wherein said engine is a variable displacement engine.

14. Apparatus according to claim 13, wherein said data from said manifold absolute pressure sensor is used by said controller to calculate cylinder air charge during transitions between fractional and maximum modes of operation.

15. Apparatus according to claim 11, wherein the code stored identifies potential mass air flow sensor deterioration.

* * * * *